United States Patent Office 3,414,558
Patented Dec. 3, 1968

3,414,558
BIS TRIAZOLE AZO DYESTUFFS
Horst Nickel and Fritz Suckfüll, Leverkusen, and Karl-Heinz Schündehutte, Opladen, Germany, assignors to Farbenfabriken Bayer Aktiengesellschaft, Leverkusen, Germany, a corporation of Germany
No Drawing. Filed Sept. 1, 1965, Ser. No. 484,438
Claims priority, application Germany, Sept. 11, 1964, F 43,957
4 Claims. (Cl. 260—157)

ABSTRACT OF THE DISCLOSURE

Bis-triazole azo dyestuffs of the formula:

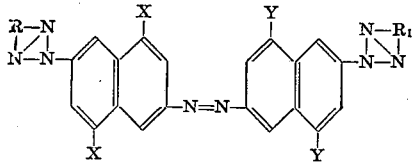

wherein R and $R_1$ represent aromatic radicals such as naphthylene in which the nitrogen atoms of the triazole groups are in the o-position to one another; one X is a sulfonic acid group and the other X is hydrogen or a sulfonic acid group; one Y is a sulfonic acid group and the other Y is hydrogen or a sulfonic acid group. Many of the dyestuffs of this class dye cotton and other materials to yellow shades with excellent light fastness.

---

The invention relates to novel dyestuffs; more particularly it relates to novel bis-triazole azo dyestuffs of the formula

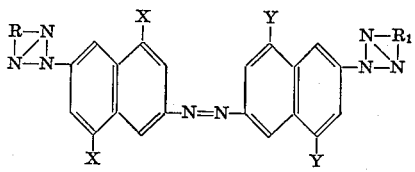

wherein R and $R_1$ represent the same or different aromatic radicals in which the nitrogen atoms of the triazole groupings are in the o-position to one another, one X stands for a sulphonic acid group and the other X for hydrogen or a sulphonic acid group, one Y denotes a sulphonic acid group and the other Y is hydrogen or a sulphonic acid group.

The new azo dyestuffs are obtained when azo dyestuffs of the formula

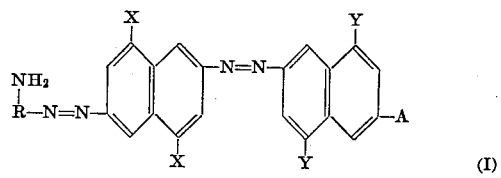

in which the radicals X and Y have the above indicated meaning, R stands for an aromatic radical in which the amino group is in the o-position to the azo grouping, and A stands for a radical

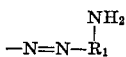

wherein $R_1$ denotes an aromatic radical in which the amino and azo groupings are in o-position to one another, or A stands for a radical

wherein $R_1$ denotes an aromatic radical in which the nitrogen atoms of the triazole ring are in adjacent position to one another, are converted into the bis-triazole compounds, and the dyestuffs thus obtained are optionally subjected to conversion reactions customary for azo dyestuffs.

The process for the production of the new dyestuffs can also be modified in that approximately one mol each of the nitro-triazole compounds of the formulae

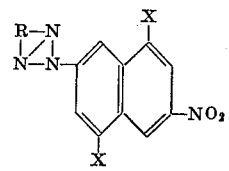

(II)

and

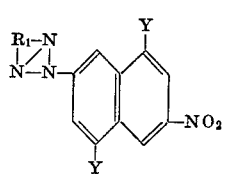

(III)

in which R, $R_1$, X and Y have the meaning stated above, and the nitrogen atoms of the triazole grouping in the radicals R and $R_1$ are in adjacent position to one another, whereby R and $R_1$ may be identical or different, are reductively linked to form azo compounds (VI).

Another process for the production of the new dyestuffs consists in that amino-triazole compounds of the formulae

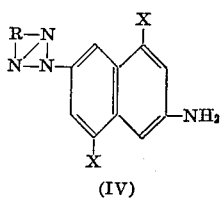 and 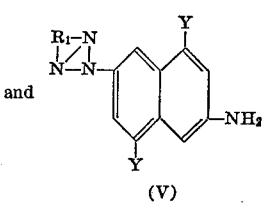

(IV)                    (V)

in which R, $R_1$, X and Y have the meaning stated above, are converted into the azo compounds (VI) by reacting the syn-diazo sulphonate of one amino compound with the diazo compound of the other amino compound.

The conversion of the dyestuffs (I) into the bis-triazole compounds is carried out by known methods, for example, by oxidation with ammoniacal solutions of Cu (II) salts or with a hypochlorite solution in an aqueous medium.

The reductive linkage of two nitro molecules to the azo compound is carried out by known methods. Reduction by means of glucose is preferred, and other suitable reducing agents may be added, such as alkali metal salts of dithionous acid (dithionites), aldehyde-sulphoxylates (rongalite) or zinc, which convert amounts of azoxy dyestuff into the azo compound in an alkaline or neutral medium.

The conversion of the amino-triazole compounds (IV) and (V) into the azo compound (VI) is also carried out by known methods, viz. by the so-called sulphite method (according to the instructions given in German patent specification No. 78,225 or British patent specification No. 887,262), in that the diazo sulphonate of one aminotriazole compound is reacted with the diazo compound of the other aminotriazole compound.

The starting dyestuffs (I) are prepared, for example, in that the diazo compound of the nitro-aminonaphthalene-sulphonic acid of the formula

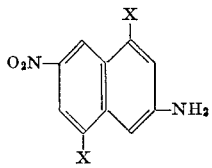

(VII)

in which X has the stated meaning, is coupled with an amino compound

in the 0-position to the amino group, and the resultant dyestuff subsequently reductively linked with a nitro-azo dyestuff of the formula

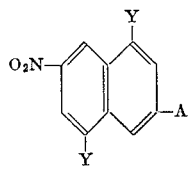

(VIII)

in which Y and A have the stated meaning, to form the azo compound, or in that the tetrazo compound of the diamino-azo compound of the formula

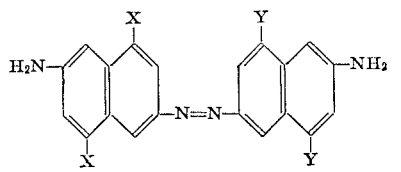

(IX)

in which X and Y have the stated meaning, are coupled with amino compounds R—NH₂ in the o-position to the amino group.

As has already been mentioned, the dyestuffs (VI) which are obtainable by the various methods, can be subjected to further reactions customary for azo dyestuffs, for example, diazotisation and coupling, or acylation as well as condensation. If the dyestuffs contain metallisable groups, they can be converted into the metal complex compounds by the action of metal yielding agents.

Suitable amino group-containing coupling components

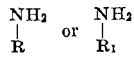

as are required for the preparation of the starting products or dyestuffs to be used according to the invention, are, for example, 2-aminonaphthalene, 2-aminonaphthalene-5-, or -6- or -7-monosulphonic acid, 2-aminonaphthalene-3,6-, -3,7- or -4,7- or -5,7-disulphonic acid, 1-aminonaphthalene-4- or -5-sulphonic acid, 1-aminonaphthalene-4,6-, -4,7- or -4,8-disulphonic acid, or technical mixtures, such as Dahl's acid or Delta acid.

The following examples are given for the purpose of illustrating the invention.

Example 1

58 parts by weight (0.1 mol) of the triazole compound of the formula

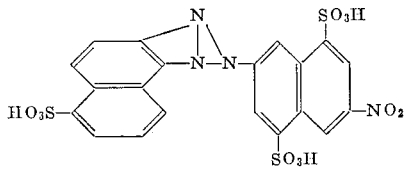

(prepared by coupling diazotised 6-nitro-2-aminonaphthalene-4,8-disulphonic acid with 2-aminonaphthalene-5-sulphonic acid (triazole component) and triazolisation), are dissolved in 2000 parts by volume of warm water. 155 parts by volume of a 40% sodium hydroxide solution and a solution of 18 parts by weight glucose in 45 parts by volume of water are added to this solution at 50 to 55° C. The reaction mixture is stirred at 50° C. for 90 minutes, then heated to 85° C., 9.5 parts by weight sodium-formaldehyde-sulphoxylate (rongalite) are strewn in as additional reducing agent, and stirring is continued until the azo compound is obtained. Air is then passed through the mixture and the resultant dyestuff of the formula

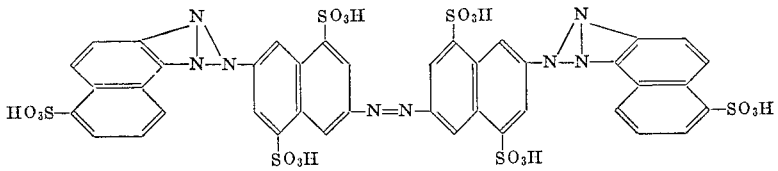

is salted out with sodium chloride and isolated.

In the dry state the dyestuff is a dark powder which readily dissolves in water with a yellow colour. Cotton is dyed by this dyestuff in clear yellow shades of good fastness to light, chlorine, perspiration, and brightening, and in mixed fabrics with synthetic superpolyamide fabrics the latter are well reserved.

A similar yellow cotton dyestuff is obtained when sodium dithionite is used as additional reducing agent, instead of rongalite.

The additional reduction to the azo dyestuff can also be carried out with zinc and ammonium chloride in a neutral medium.

If, instead of the above nitro-triazole compound, a compound is used as triazole component which contains 2-aminonaphthalene-6-sulphonic acid, 2-aminonaphthalene-7-sulphonic acid, 1-aminonaphthalene-4-sulphonic acid, 2-aminonaphthalene-3,6-disulphonic acid, 2-aminonaphthalene-5,7-disulphonic acid, or 1-aminonaphthalene-4,6-disulphonic acid, then dyestuffs are obtained which dye cotton in clear yellow shades.

If a mixture of nitro-triazole compounds containing 2-aminonaphthalene-5- and -6-sulphonic acid (in the ratio 1:1) is used and the procedure described above is followed, then a dyestuff is obtained which dyes cotton in clear yellow shades.

Example 2

55 parts by weight (0.05 mol) of the azo compound of the formula

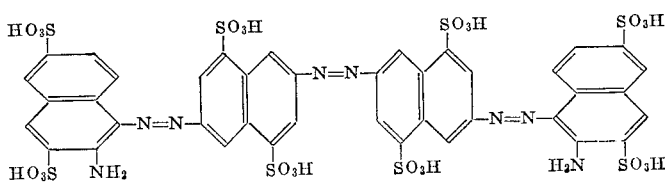

(prepared by coupling 1 mol of the tetrazotised compound of the formula

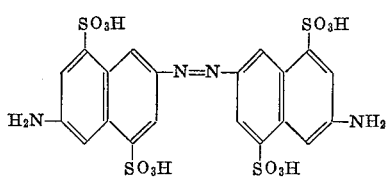

with 2 mol 2-aminonaphthalene-3,6-disulphonic acid) are heated with 2000 parts by volume water to 95° C., and a solution of 55 parts by weight crystalline copper sulphate in 200 parts by volume of water and 140 parts by volume of 25% aqueous ammonia is added. The reaction mixture is heated to boiling temperature and stirred until the triazolisation is completed. The colour of the dyestuff has then turned from red to yellow. The dyestuff is salted out with sodium chloride and isolated while hot. After the usual purification to remove any adhering residues of copper salt, the dyestuff is dried.

The dry dyestuff is a dark powder which readily dissolves in water and dyes cotton in clear yellow shades.

If 2-aminonaphthalene-5- or -6-sulphonic acid is used as triazole component, then dyestuffs are obtained which dye cotton in clear yellow shades.

Example 3

The diazonium salt solution prepared is known manner from 55 parts by weight (0.1 mol) of the triazole compound of the formula

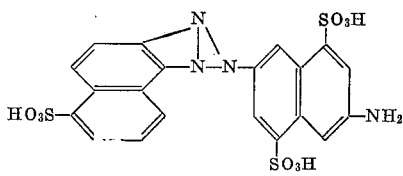

is mixed with a solution of 12.6 parts by weight crystalline sodium sulphite and 28 parts by weight sodium acetate in 100 parts by volume of water. The reaction sets in with evolution of nitrogen. The mixture is slowly heated to 80° C. and stirred until the reaction is completed. After isolating and drying, a dyestuff is obtained which dyes cotton in yellow shades and is identical with the dyestuff obtained according to Example 1.

We claim:
1. A dyestuff of the formula:

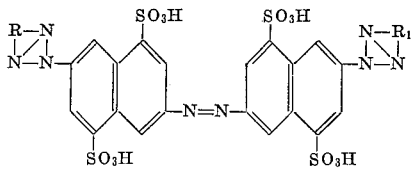

wherein R and $R_1$ stand for naphthylene substituted by one or two sulfonic acid groups carrying the nitrogen atoms of the triazole groupings in o-position to one another.

2. The dyestuff of the formula

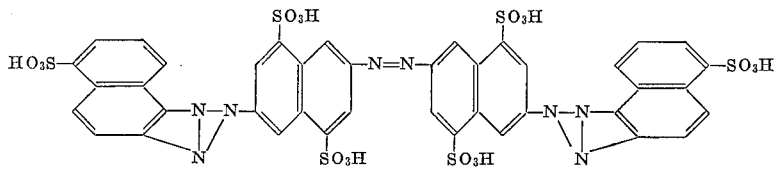

3. The dyestuff of the formula

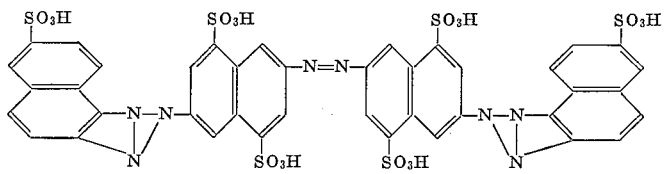

4. The dyestuff of the formula

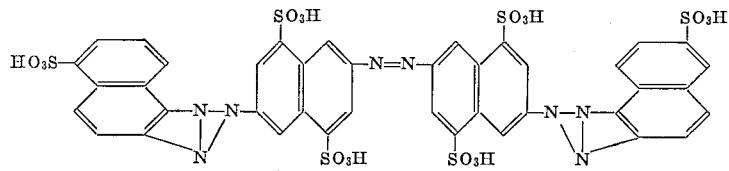

References Cited

UNITED STATES PATENTS 2,932,636   4/1960   Suckfull et al. _____ 260—157

FLOYD D. HIGEL, *Primary Examiner.*